(12) United States Patent
Birkner et al.

(10) Patent No.: US 7,288,170 B2
(45) Date of Patent: Oct. 30, 2007

(54) PROCESS FOR PRODUCING A READY-TO-USE ELECTROLYTE

(75) Inventors: Jens Birkner, Mülheim (DE); Ursus Krüger, Berlin (DE); Daniel Körtvelyessy, Berlin (DE); Ralph Reiche, Berlin (DE); Jan Steinbach, Berlin (DE); Marc de Vogelaere, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/972,309

(22) Filed: Oct. 22, 2004

(65) Prior Publication Data
US 2005/0109636 A1    May 26, 2005

(30) Foreign Application Priority Data
Oct. 24, 2003   (EP) ................................ 03024372

(51) Int. Cl.
B01D 71/02       (2006.01)
C02F 1/48        (2006.01)
(52) U.S. Cl. ................ 204/157.42; 204/633; 205/101; 205/704; 210/912; 210/913; 252/500
(58) Field of Classification Search ............... 252/500; 204/157.42, 157.15, 155, 529, 519; 210/912
See application file for complete search history.

(56) References Cited

U.S. PATENT DOCUMENTS

| | | | |
|---|---|---|---|
| 4,042,474 A | 8/1977 | Saarinen | |
| 4,053,400 A | 10/1977 | Merker et al. | |
| 4,882,018 A * | 11/1989 | Tison | 205/560 |
| 4,956,154 A * | 9/1990 | Magdics et al. | 423/54 |
| 5,002,645 A * | 3/1991 | Eastland et al. | 204/157.42 |
| 5,064,510 A * | 11/1991 | Thoma et al. | 205/109 |
| 6,391,177 B1 * | 5/2002 | Crotty | 204/529 |

FOREIGN PATENT DOCUMENTS

| | | |
|---|---|---|
| DE | 44 35 774 C1 | 3/1996 |
| DE | 197 31 616 A1 | 1/1999 |
| DE | 198 50 235 A1 | 5/2000 |
| FR | 2 463 201 | 2/1981 |

OTHER PUBLICATIONS

"Recycling-Handbuch, Strategien-Technologien-Produkte", VDI Verlag, 1996, pp. VII-XV and 372-389, Werner Nickel, Germany.

* cited by examiner

Primary Examiner—Mark Kopec
Assistant Examiner—Kallambella Vijayakumar

(57) ABSTRACT

A process is intended to allow simple and particularly reliable electrolyte generation and conditioning from metal-containing used electrolytes and/or used process solutions and/or pulverulent metal wastes. For this purpose, waste products containing metal ions from metal surface treatment processes are to be treated by producing and/or using a metal ion mixed solution, replacing anions contained in the metal ion mixed solution with anions selected for an intended use selected and selectively removing metal ions which are categorized as unsuitable for the intended use selected from the metal ion mixed solution prepared in this way.

12 Claims, 3 Drawing Sheets

PROCESS FOR PRODUCING A READY-TO-USE ELECTROLYTE

CROSS REFERENCE TO RELATED APPLICATION

This application claims priority of the European application No. 03024372.9 EP filed Oct. 24, 2003, which is incorporated by reference herein in its entirety.

FIELD OF THE INVENTION

The invention relates to a process for producing a ready-to-use electrolyte. It also relates to an electrolyte produced in this way, and to its use.

BACKGROUND OF THE INVENTION

An electrolyte is a substance whose aqueous solutions or melts contain freely mobile ions which migrate toward the electrodes when an electric voltage is applied. Electrolytes can be used, for example, for electrochemical MCrAlY coating (M stands for nickel, cobalt, etc.; Y stands for yttrium and/or rhenium; silicon, hafnium, tantalum may also be present). MCrAlY coatings are usually used as thermally stable corrosion and oxidation protection, in particular in stationary gas turbines for generating energy and in the field of engines for aircraft and other means of transport.

Thermal spraying processes are mainly used of the coating. However, in this coating process it is usual for up to 70% of the metal powder not to be applied to the component. This metal powder therefore represents what is known as a waste product which, although in principle of high value, according to environmental guidelines has to be disposed of as a hazardous material or a substance which is harmful to health.

Used electrolytes containing high concentrations of the corresponding metals are produced during chemical or electrochemical removal or what is known as stripping of MCrAlY layers as part of the repair and refurbishment of gas turbine components. These electrolytes are in some cases classified as carcinogenic and/or toxic in other ways, and consequently solutions thereof usually have to be evaporated down in order to reduce their weight and then disposed of in a complex and expensive way as electroplating slurry containing heavy metals.

In general, the surface treatment of metals, both in electroplating technology and in material-removing processes, such as pickling, etching, pyrolysis, etc., and also the processing of metal-containing substances from chemistry, metallurgy and environmental technology produce process solutions with high levels of cations of the dissolved metals or disruptive foreign metals. On account of these high levels of metals, solutions or used electrolytes of this type have only a limited service life and uptake capacity. The renewal of baths of this type, which is periodically required, entails considerable outlay, both for replacing the chemicals used and for treatment and disposal of the used process solutions in a manner which complies with environmental regulations.

It is therefore desirable to at least reduce or even completely eliminate the costs of disposing of used electrolytes and waste produces which may form in the abovementioned processes and at the same time to keep the outlay associated with the provision of staring substances for producing a ready-to-use electrolyte at a particularly low level.

SUMMARY OF THE INVENTION

Therefore, the invention is based on the object of providing a process which allows simple and particularly reliable electrolyte generation and conditioning from metal-containing used electrolytes and/or other process solutions and/or pulverulent metal wastes. Furthermore, it is intended to describe a use for an electrolyte produced in this way.

With regard to the process, this object is achieved by a metal ion mixed solution being produced and/or used to treat waste products containing metal ions from metal surface treatment processes, by exchanging anions contained in the metal ion mixed solution for anions which have been selected for an intended use selected, and selectively removing metal ions which have been categorized as unsuitable for the intended use selected from the metal ion mixed solution which has been prepared in this way.

In this context, the invention is based on the consideration that the used electrolytes, other process solutions and pulverulent metal wastes produced in surface technology or metal chemistry, which usually have high concentrations of metal ions, should be utilized, on account of these high-value constituents, rather than, as has in many cases been customary hitherto, being disposed of directly at considerable cost without further use. For this purpose, these waste products should be treated, in particular in a simple and environmentally friendly way, for further use. In order, furthermore, also to be able to take into account economic aspects, it is expedient for the process to be linked into a recycling process. To this end, the waste products containing metal ions from metal surface treatment processes are used as starting substances for the production of an electrolyte.

For simple and particularly effective electrolyte generation and conditioning, the waste products should be dissolved, and the content of ions which interfere with the production process and/or may have an adverse effect on the further use of the electrolyte should be kept at particularly low levels. For this reasons, anions contained in a metal ion mixed solution of this type are replaced by anions which have been selected for an intended use selected, and metal ions which have been categorized as unsuitable for the intended use selected are removed from the metal ion mixed solution prepared in this way.

In a particularly advantageous configuration of the process, the waste products containing metal ions that are used are preferably used electrolytes, exhausted metal-containing etching or pickling solutions and their alloys, used baths from the electroplating industry or extracts which are obtained during the treatment of metal slurries and metal-containing residues from metallurgy, the chemical industry with acids, and/or pulverulent metal wastes from a plasma spraying or other coating process.

For the process sequence for the production of a versatile electrolyte to proceed without disruption and therefore efficiently, the levels of disruptive anions are depleted. For this purpose, in particular chloride ions contained in the metal ion mixed solution are expediently exchanged or their concentration reduced. It is preferably for them to be exchanged for sulfate or sulfamate ions.

In a particularly advantageous configuration of the process, metal ions which are undesirable in particular for subsequent use are removed from the prepared metal ion mixed solution. The complexing of the metal ions in question is expediently recommended for particularly selective, easy-to-implement removal. A selectively permeable membrane which separates the metal ion mixed solution and a cleaning solution from one another and has organic substances that form metal complexes in its pores is advantageously used for this purpose (cf. "Recycling Handbuch, Strategien, Technologien, Produkte" [Recylcing handbook, strategies, technologies, products], VDI-Verlag, ISBN 3-18-401 386-3). This membrane equipped in this way takes up the metal ions that are to be removed on the side of the prepared metal ion mixed solution and releases them again on the side of the cleaning solution after they have passed through the membrane.

The solution and exchange processes involved in the treatment of waste products containing metal ions are expediently accelerated by electric fields and mechanical vibrations. For this purpose, in a particularly advantageous configuration of the process, electrodes and/or sonotrodes are provided and are brought into contact with the prepared metal ion mixed solution and with the cleaning solution.

For an alternative removal, which is particularly simple to implement, of undesired metal ions, it is expedient to provide a single-chamber system. Preferably an inert anode and a deposition electrode, at which metal ions which are categorized as unsuitable for the intended use selected are deposited, are arranged in the prepared metal ion mixed solution in this system.

In one specific embodiment of this process, it is advantageous for an electrode and a deposition electrode, which is in the form of a component and at which metal ions which have been categorized as unsuitable for the intended use selected are deposited, to be arranged in the prepared metal ion mixed solution. Therefore, the process is suitable both for the production of a ready-to-use electrolyte for subsequent use and also at the same time for increasing the usability of the corresponding component, for example by forming a protective coating by means of the deposited metal ions.

To observe the production process and the possibility of influencing it, it is expedient for the entire process to be monitored continuously. To this end, it is advantageous for the basic data of the solutions, such as the individual ion concentrations, temperature, pH and conductivity of the prepared metal ion mixed solution and/or the cleaning solution and of the electrolyte produced, to be measured.

Depending on the specific subsequent use, the electrolyte produced using one of the above processes expediently has a relatively high ion concentration of the desired metals and a relatively low concentration of other disruptive or undesired ions. For this purpose, it is preferably for the ion concentration range for nickel, cobalt and chromium in each case to be approximately 50 to 500 g/l, and the range for other metals in each case to be approximately 1 to 100 g/l.

An electrolyte can expediently be used in the electrochemical sector. Therefore, the electrolyte produced using one of the above processes is preferably used for the meal electrolysis of bars, for electrochemical metal coatings, in particular MCrAlY coatings (M stands for nickel, cobalt, etc.; Y stands for yttrium and/or rhenium; silicon, hafnium, tantalum may also be present), processes of a similar type or if appropriate in situ after filtering and cleaning stages in the electrolyte circuit.

The advantages achieved by the invention consist in particular in the fact that a ready-to-use electrolyte with the required ion concentrations can be produced easily and inexpensively by concentrating or reconditioning metal-containing etching solutions, pickling solutions and/or used electrolytes and/or pulverulent metal wastes with the addition and separation of certain substances or types of ions. For this purpose, by way of example, chloride ions are exchanged for sulfate ions or sulfamate ions, or at least the concentration of the chloride ions is reduced, and metal ions which are categorized as unsuitable for the intended use selected are removed selectively by means of organometal complexes. In particular the choice of the waste products containing metal ions from surface technology or metal chemistry as staring substances not only allows disposal costs to be saved and environmental pollution to be reduced, but also preserves resources and preserves added-value measures or processing states which would otherwise require an additional outlay on energy and materials.

BRIEF DESCRIPTION OF THE DRAWINGS

An exemplary embodiment of the invention is explained in more detail with reference to the drawing, in which.

DETAILED DESCRIPTION OF THE INVENTION

Identical parts are provided with the same reference symbols throughout the figures.

Figure 1:
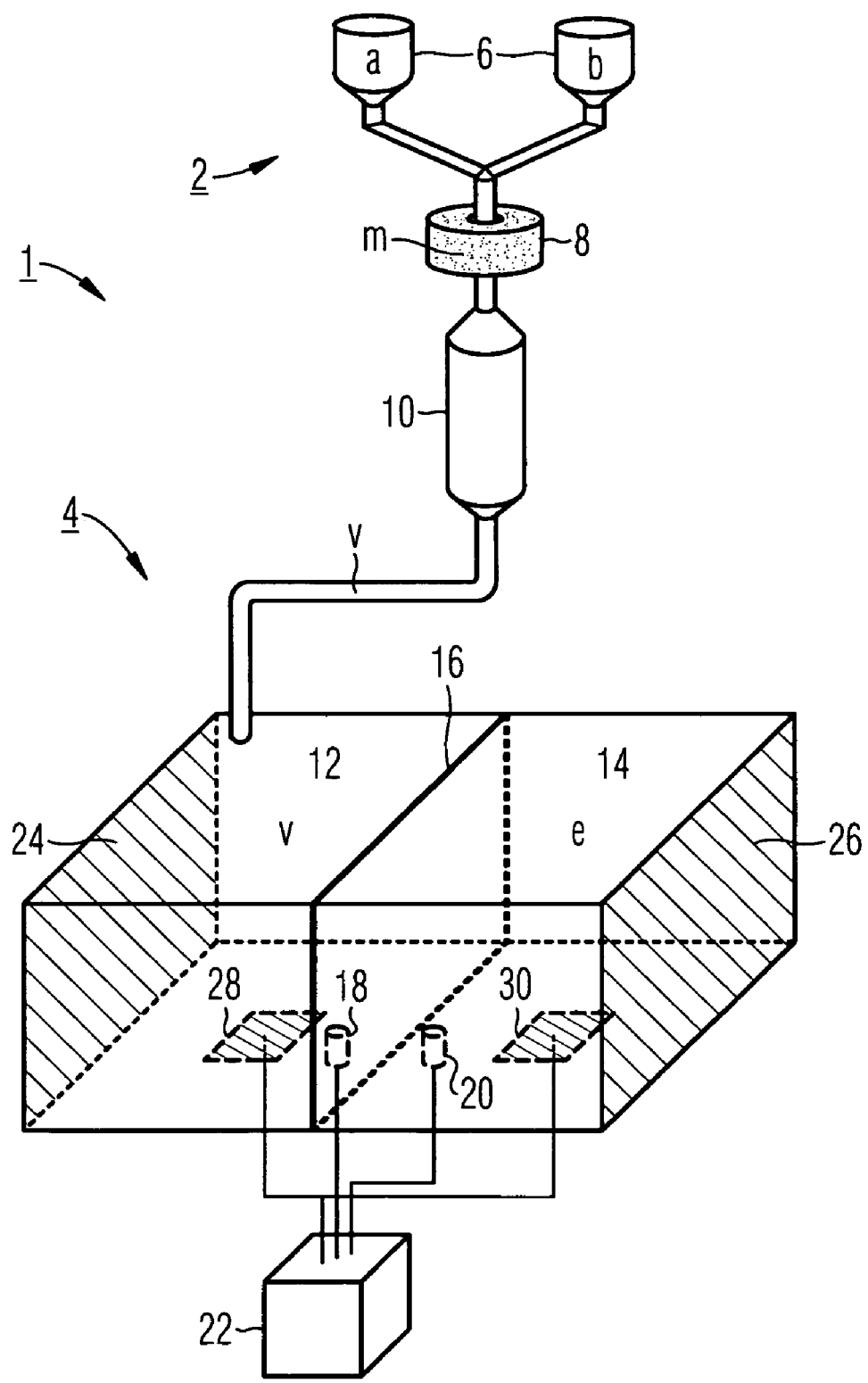
FIG. 1 shows a diagrammatic structure of a first embodiment of an installation for treating waste products containing metal ions from metal surface treatment processes.

The exemplary embodiment shown in FIG. 1 illustrates an installation 1 which comprises a preparation station 2 for waste products a, b containing metal ions, and a downstream electrochemical system 4.

In the exemplary embodiment, the preparation station 2 has feed devices 6 for liquid and solid chemicals, a mixing device 8 and an anion exchanger 10. The waste products a, b containing metal ions, such as pulverulent metal waste produced, for example, in plasma spraying processes and, for example, a 20 to 30 percent strength by weight hydrochloric acid from a pickling process containing nickel, cobalt and chromium ions, are brought together in the mixing device 8 via the feed devices 6, so as to produce a metal ion mixed solution m.

For a trouble-free and therefore efficient process sequence, the concentration of certain anions is to be kept at a low level. In the exemplary embodiment, therefore, the process is directed in particular at lowering the levels of chloride ions. The metal ion mixed solution m is passed over a suitably equipped anion exchanger 10. This selective ion exchanger is based, for example, on liquid membrane technology.

In this way, the metal ion mixed solution m is prepared for the electrochemical system 4. Therefore, it is a prepared metal ion mixed solution v which enters the electrochemical system 4.

In the first exemplary embodiment, as shown in FIG. 1, the electrochemical system 4 comprises two chambers 12 and 14, which are separated from one another by a selectively permeable membrane 16. The membrane 16 prevents mixing of the prepared metal ion mixed solution v which has been passed into one chamber 12 with a low-ion, aqueous or nonaqueous, so-called cleaning solution e which is present in the other chamber 14.

Measurement sensors 18 and 20 for determining the individual ion concentrations, the temperature, the pH and the conductivity or the like are immersed in the prepared metal ion mixed solution v and the cleaning solution e. This allows continuous monitoring of the entire process sequence by means of a monitoring and control unit 22, if appropriate on line.

Depending on the particular application area, certain metal ions are undesirable with a view to producing a versatile electrolyte. Therefore, these ions should be completely removed or at least depleted to a sufficient extent. Complex-forming with organic substances is recommended to achieve this. In the first exemplary embodiment, the membrane 16 is formed from a ceramic which is equipped in its pores with specific organic substances forming metal complexes (e.g. for copper LIX 860-5-dodecyl-salicyl-aldoxim in kerosene solvent) (cf. "Recycling Handbuch, Strategien, Technologien, Produkte", VDI-Verlag, ISBN 3-18-401 386-3).

These organic substances which form metal complexes take up the metal ions that are to be removed on the side of the prepared metal ion mixed solution v and release them again on the side of the cleaning solution e after they have passed through the membrane.

The solution and exchange processes involved in the treatment of waste products a, b containing metal ions are accelerated by electric fields and mechanical vibrations. For this purpose, in the exemplary embodiment electrodes 24 and 26 and sonotrodes 28 and 30, which are brought into contact with the prepared metal ion mixed solution v and with the base electrolyte e, are provided in both chambers 12 and 14.

In the chamber 12, the electrolyte produced in the electrochemical system 4 described above has a relatively high ion concentration of the desired metals and a relatively low chloride ion concentration. For nickel, cobalt and chromium, the ion concentration range is in each case approximately 50 to 500 g/l, and for other metals the ion concentration range is approximately 1 to 100 g/l. The precise concentrations of metal ions depend on the alloy which it is subsequently desired to electrolytically deposit.

Figure 2:
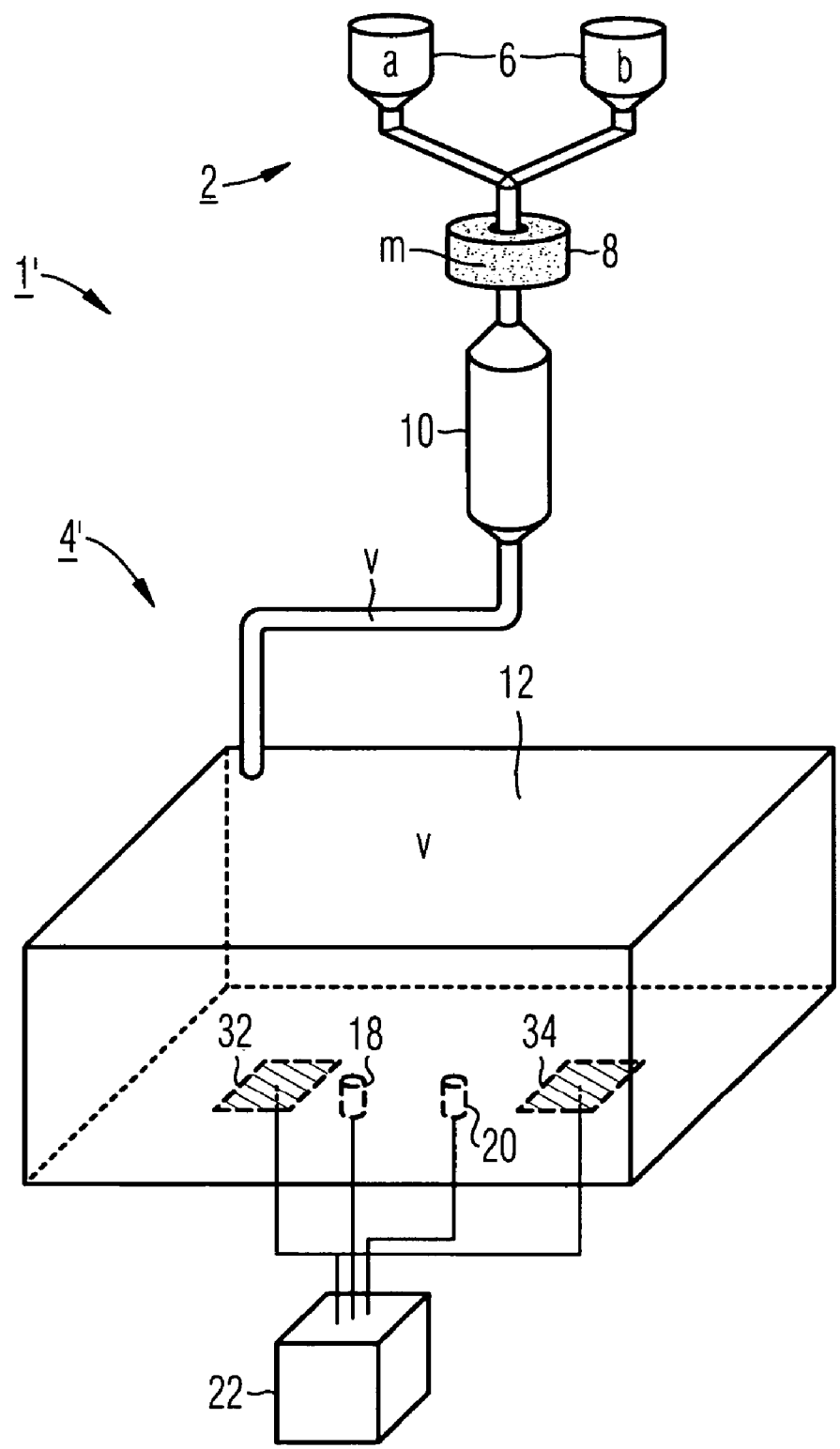
FIG. 2 shows diagrammatic structure of a second embodiment of the abovementioned installation.

In the further exemplary embodiment, the electrochemical system 4' of the installation 1', as shown in FIG. 2, comprises, for example, just one chamber 12, in which an inert anode 32 and a deposition electrode 34 are arranged in the prepared metal ion mixed solution v; metal ions which are categorized as unsuitable for producing the desired electrolyte are deposited on the deposition electrode 34.

Figure 3:
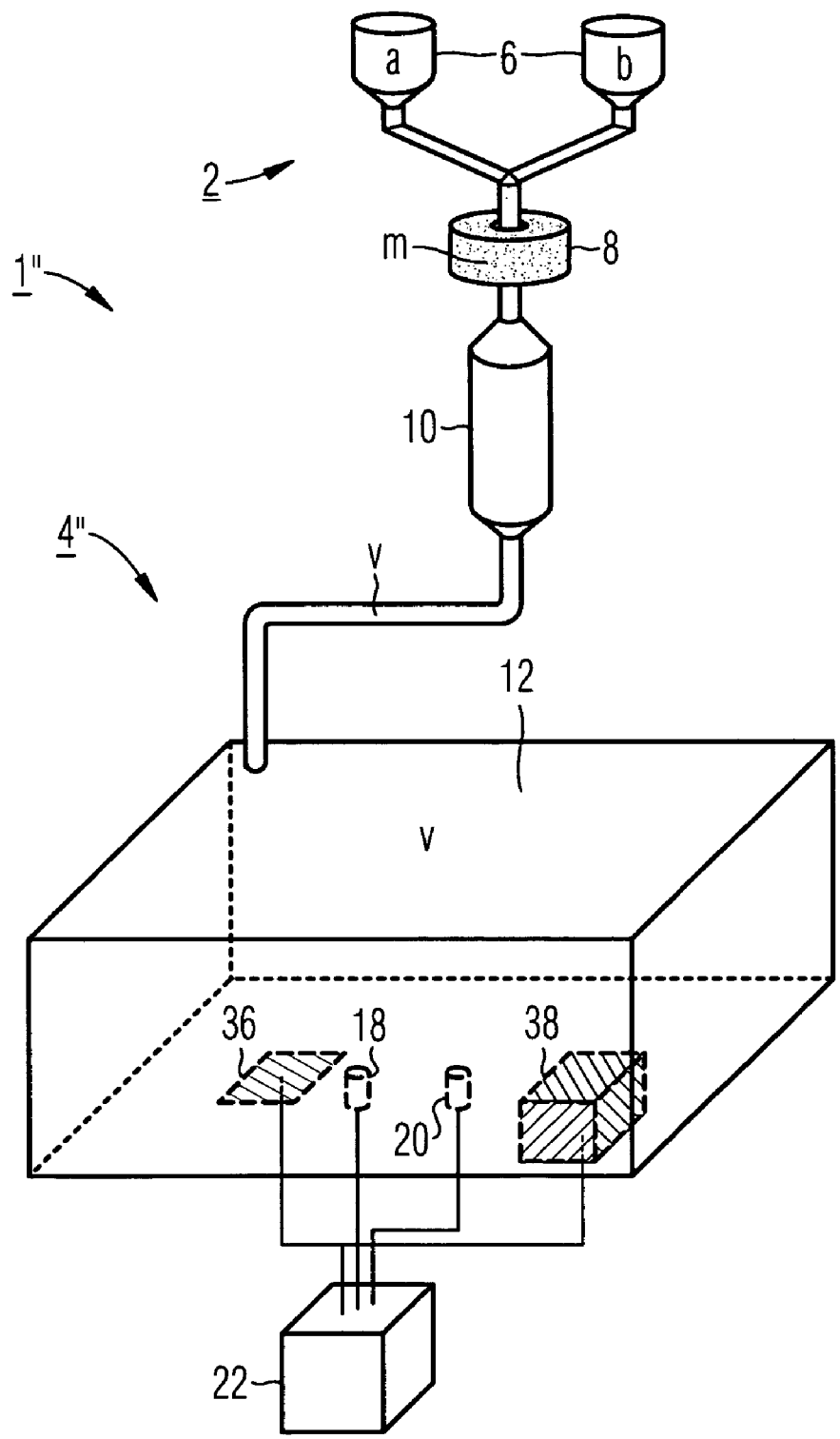
FIG. 3 shows diagrammatic structure of a third embodiment of the abovementioned installation.

In a further, more specific embodiment, the electrochemical system 4" of the installation 1", as shown in FIG. 3, has a chamber 12 in which an electrode 36 and a component 38 are provided in the prepared metal ion mixed solution v, the component 38 being connected as a deposition electrode. Therefore, the process is suitable both for producing a ready-to-use electrolyte for subsequent use and also at the same time for improving the usability of the corresponding component, for example by the deposited metal ions forming a protective coating.

Measurement sensors 18 and 20 for determining the ion concentrations, the temperature, the pH and the conductivity or the like may also be immersed in the prepared metal ion mixed solutions V of the second and third exemplary embodiments. This allows continuous monitoring of the entire process sequence by means of a monitoring and control unit 22, if appropriate on line.

Sonotrodes 28 and 30 may likewise be present in the prepared metal ion mixed solutions v of the second and third exemplary embodiments.

The chamber 14 may likewise be present in the prepared metal ion mixed solutions v of the second and third exemplary embodiments.

The invention claimed is:

1. A process for producing an electrolyte, comprising:
producing in a mixing device a metal ion containing mixed solution from a waste product that contains metal ions;
providing an anion exchanger to directly receive from the mixing device the ion mixed solution;
passing the ion mixed solution through the anion exchanger and then to an electrochemical system sized and configured to produce a prepared metal ion mixed solution; and
bringing electrodes into contact with the prepared metal ion mixed solution such that at least impurity metal ions are selectively removed from the prepared metal ion mixed solution;
wherein the impurity metal ions are selectively removed by a selectively permeable ceramic membrane comprising pores that separates the prepared metal ion mixed solution and a cleaning solution from one another, the ceramic membrane comprises an organic complexing agent that forms metal complexes in the pores of the membrane.

2. The process as claimed in claim 1, wherein the waste product containing metal ions is selected from the group comprising as used electrolytes, exhausted metal-containing etching or pickling solutions and their alloys, used baths from the electroplating industry or extracts which are obtained when metal slurries and metal-containing residues from metallurgy and the chemical industry are treated with acids, and/or pulverulent metal wastes from a plasma spraying or other coating process, and combinations thereof.

3. The process as claimed in claim 1, wherein chloride ions contained in the metal ion mixed solution are exchanged or at least the concentration of these ions is reduced.

4. The process as claimed in claim 3, wherein the concentration of chloride ions is reduced.

5. The process as claimed in claim 3, wherein the chloride ions contained in the metal ion mixed solution are exchanged for sulfate or sulfamate ions.

6. The process as claimed in claim 1, wherein electrodes or sonotrodes are brought into contact with the prepared metal ion mixed solution and with the cleaning solution.

7. The process as claimed in claim 1, wherein the individual ion concentrations, the temperature, the pH, and the conductivity of the prepared metal ion mixed solution and of the cleaning solution are measured.

8. The process as claimed in claim 1, wherein an inert anode and a deposition electrode having the impurity metal ions are arranged in the prepared metal ion mixed solution.

9. The process as claimed in claim 8, wherein the deposition electrode is designed as a component.

10. The process as claimed in claim 9, in which the ion concentration, the temperature, the pH and the conductivity of the prepared metal ion mixed solution and of the electrolyte produced are measured and monitored.

11. The process as claimed in claim 9, in which the ion concentration, the temperature, the pH, and the conductivity of the prepared metal ion mixed solution or of the electrolyte produced are measured and monitored.

12. A process for producing an electrolyte, comprising:
producing in a mixing device a metal ion containing mixed solution from a waste product that contains metal ions;
providing an anion exchanger to directly receive from the mixing device the ion mixed solution;

passing the ion mixed solution through the anion exchanger and then to an electrochemical system sized and configured to produce a prepared metal ion mixed solution; and bringing electrodes into contact with the prepared metal ion mixed solution such that at least impurity metal ions are selectively removed from the prepared metal ion mixed solution;

wherein the impurity metal ions are selectively removed by a selectively permeable membrane than separates the prepared metal ion mixed solution and a cleaning solution from one another and has organic substances that form metal complexes in pores of the membrane; and wherein electrodes and sonotrodes are brought into contact with the prepared metal ion mixed solution and with the cleaning solution.

* * * * *